(12) United States Patent
Chung et al.

(10) Patent No.: US 10,414,881 B2
(45) Date of Patent: Sep. 17, 2019

(54) METHOD OF MAKING THERMOPLASTIC VULCANIZATES AND THERMOPLASTIC VULCANIZATES MADE THEREFROM

(71) Applicant: ExxonMobil Chemical Patents Inc., Baytown, TX (US)

(72) Inventors: Oscar O. Chung, Houston, TX (US); Porter C. Shannon, Seabrook, TX (US); Ronald D. Vlcek, Medina, OH (US); Richard G. Martin, Monmouthshire (GB); Christopher E. Hrbacek, Pensacola, FL (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 6 days.

(21) Appl. No.: 15/520,772

(22) PCT Filed: Nov. 25, 2014

(86) PCT No.: PCT/US2014/067206
§ 371 (c)(1),
(2) Date: Apr. 20, 2017

(87) PCT Pub. No.: WO2016/085457
PCT Pub. Date: Jun. 2, 2016

(65) Prior Publication Data
US 2018/0237597 A1 Aug. 23, 2018

(51) Int. Cl.
*C08J 3/22* (2006.01)
*C08L 23/16* (2006.01)
*C08K 3/22* (2006.01)
*C08L 23/12* (2006.01)

(52) U.S. Cl.
CPC ............... *C08J 3/226* (2013.01); *C08K 3/22* (2013.01); *C08L 23/12* (2013.01); *C08L 23/16* (2013.01); *C08J 2323/16* (2013.01); *C08J 2423/12* (2013.01); *C08K 2003/2206* (2013.01); *C08K 2003/2217* (2013.01); *C08K 2003/2227* (2013.01); *C08K 2003/2296* (2013.01); *C08L 2205/025* (2013.01)

(58) Field of Classification Search
CPC .... C08J 3/226; C08J 2323/16; C08J 2423/12; C08L 23/16
See application file for complete search history.

(56) References Cited

U.S. PATENT DOCUMENTS

| | | |
|---|---|---|
| 515,081 A | 2/1894 | Iles |
| 2,972,600 A | 2/1961 | Braidwood |
| 3,287,440 A | 11/1966 | Giller |
| 4,311,628 A | 1/1982 | Abdou-Sabet et al. |
| 4,540,753 A | 9/1985 | Cozewith et al. |
| 4,594,390 A | 6/1986 | Abdou-Sabet et al. |
| 5,100,947 A | 3/1992 | Puydak et al. |
| 5,290,866 A | 3/1994 | Dobreski et al. |
| 5,397,832 A | 3/1995 | Ellul et al. |
| 5,656,693 A | 8/1997 | Ellul et al. |
| 5,936,028 A | 8/1999 | Medsker et al. |
| 5,952,425 A | 9/1999 | Medsker et al. |
| 6,042,260 A | 3/2000 | Heidemeyer et al. |
| 6,147,160 A | 11/2000 | Wang et al. |
| 6,437,030 B1 | 8/2002 | Coran et al. |
| 6,451,915 B1 | 9/2002 | Ellul et al. |
| 7,439,304 B2 | 10/2008 | Ellul et al. |
| 2004/0236042 A1 | 11/2004 | Datta et al. |
| 2011/0160402 A1* | 6/2011 | Roche ................. C08J 3/22 525/194 |
| 2012/0059105 A1* | 3/2012 | Kerstetter, III ......... C08L 23/10 524/412 |
| 2013/0041090 A1 | 2/2013 | Ono et al. |
| 2013/0046049 A1 | 2/2013 | Ono et al. |

FOREIGN PATENT DOCUMENTS

| | | |
|---|---|---|
| GB | 2455981 | 9/2012 |
| WO | WO2004/009327 | 1/2004 |
| WO | WO2005/028556 | 3/2005 |
| WO | WO2015/008053 | 1/2015 |
| WO | WO2016/160083 | 10/2016 |

OTHER PUBLICATIONS

Ver Strate et al. Macromolecules, 1988, pp. 3360-3371, vol. 21, Issue 12.
Maria D. Ellul, et al."Crosslink Densities and Phase Morphologies in Dynamically Vulcanized TPE's", Rubber Chemistry and Technology, Sep. 1995, pp. 573-584, vol. 68, Issue 4.
Hunter Associates Laboratory, "Hunter Lab Color Scale", Aug. 1-15, 1996, Applications Note, Hunter Associates Laboratory, Inc., Technical Services Department, 11491 Sunset Hills Road Reston, Virginia, 22090.
M.D. Ellul et al., "Chemical Surface Treatments of Natural Rubber and EPDM Thermoplastic Elastomers: Effects on Friction and Adhesion," Rubber Chemistry and Technology, Sep. 1994, p. 582, vol. 67, No. 4.

* cited by examiner

*Primary Examiner* — Edward J Cain

(57) ABSTRACT

Provided are methods of making thermoplastic vulcanizates and thermoplastic vulcanizates made therefrom. The methods can comprise adding vulcanizable elastomer to a reactor; adding a masterbatch comprising a thermoplastic resin and a metal oxide to the reactor; adding a curative to the reactor; and dynamically vulcanizing the elastomer.

21 Claims, 1 Drawing Sheet

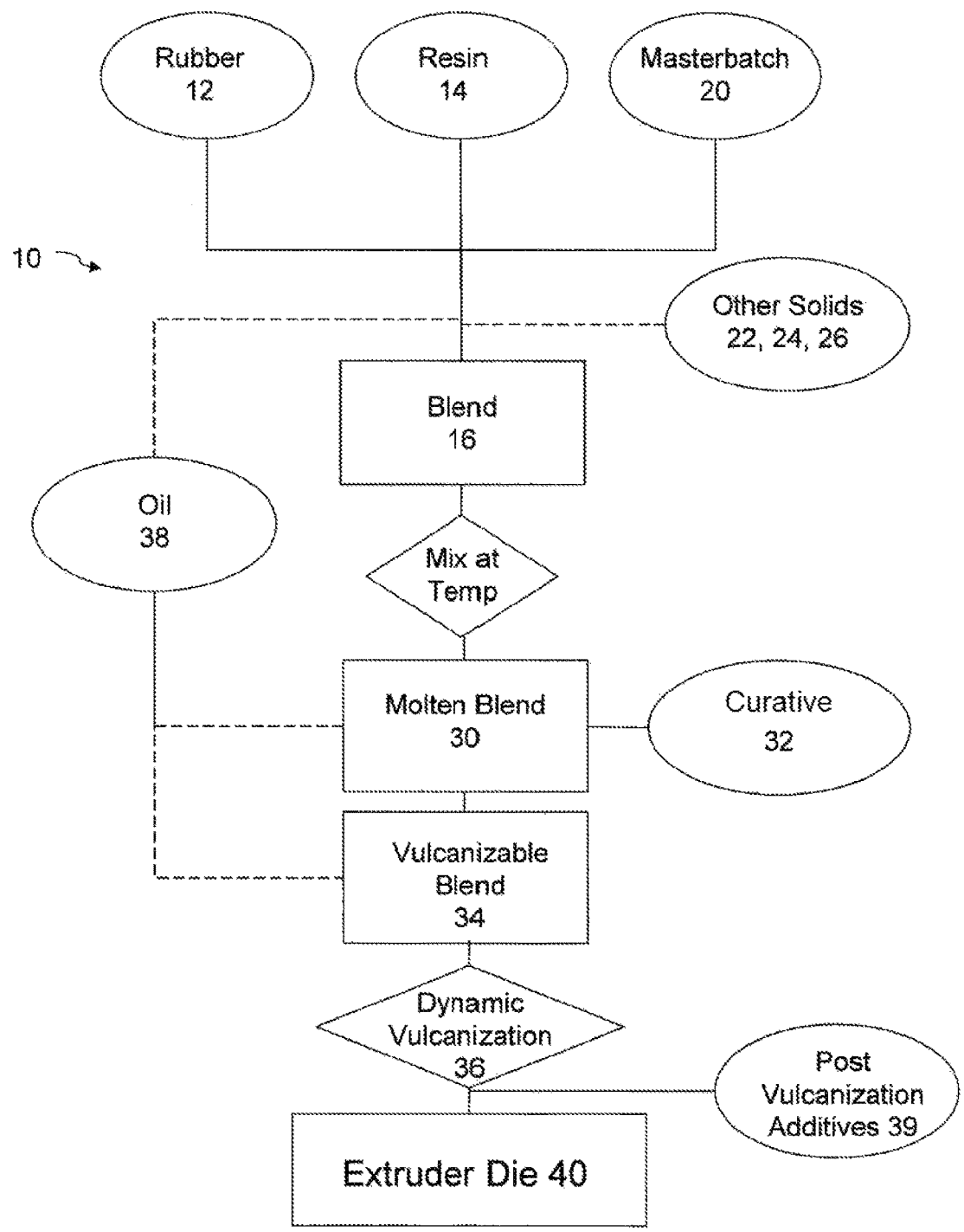

Page 1

METHOD OF MAKING THERMOPLASTIC VULCANIZATES AND THERMOPLASTIC VULCANIZATES MADE THEREFROM

PRIORITY CLAIM

This application is a National Phase Application claiming priority to PCT Application Serial No. PCT/US2014/067206 filed Nov. 25, 2014, the disclosure of which is incorporated herein by reference in its entirety.

FIELD OF THE INVENTION

The present invention relates to methods for making thermoplastic vulcanizates, and thermoplastic vulcanizates made therefrom.

BACKGROUND OF THE INVENTION

Thermoplastic vulcanizates ("TPVs") comprise blends of dynamically cured elastomers and thermoplastic resins, where the elastomer may be dispersed within the thermoplastic resin phase as finely-divided elastomer particles. TPVs have advantageously demonstrated many of the properties of thermoset elastomers, yet are processable as thermoplastics. As such, elastomeric articles are often extruded from TPVs using thermoplastic extruding techniques.

Metal oxides, such as zinc oxide, are often used in the production of TPVs. The metal oxide can act as a reaction moderator and/or as a heat aging stabilizer for the TPV. For example, PCT Publication No. WO2005/028556 and U.S. Pat. No. 7,439,304 B2 describe compositions comprising (i) a dynamically-cured rubber, (ii) from about 20 to about 300 parts by weight of a thermoplastic resin per 100 parts by weight rubber, (iii) from 0.2 to 0.9 parts by weight stannous chloride per 100 parts by weight rubber, and (iv) from 0.25 to 4.0 parts by weight metal oxide per 100 parts by weight rubber.

However, in the process for making the TPV the metal oxide, such as zinc oxide, is usually fed to the reactor/mixer in the form of powder. It has been observed that metal oxide powder, such as zinc oxide powder, can have an affinity for the metal surface of the feeder and a strong tendency for compaction within the feeder. This can result in inconsistent addition of the metal oxide to the extruder and in some cases a fouled or plugged feeder. In such cases, removal of blockages within the feeder may result in stoppage of the TPV production line, or may require a new feeder for replacement. Additionally, certain metal oxide powders that have a smaller particle sizes may be even more difficult to handle.

Inconsistent dispersion of the metal oxide into the TPV production process, may also affect the cross-linking of the elastomeric phase during vulcanization. As such, the resulting TPVs may have reduced cross-link density and increased oil swell.

Therefore, there is a need for methods of making TPVs that minimize or eliminate issues arising from addition of metal oxide powders, and to increase the consistency of the addition of the metal oxide to the process. There is also a need to provide methods of making TPVs that produce TPVs having improved cross link density and/or exhibit decreased oil swell.

BRIEF DESCRIPTION OF THE DRAWINGS

FIG. 1 is a flow chart showing a process according to some embodiments of the invention.

SUMMARY OF THE INVENTION

Provided herein are methods of making thermoplastic vulcanizate, the method comprising the steps of adding vulcanizable elastomer to a reactor; adding a masterbatch consisting essentially of a thermoplastic resin and a metal oxide to the reactor; adding a curative to the reactor; and dynamically vulcanizing the elastomer with the curative in the presence of the metal oxide.

One or more embodiments further provide a method of making a thermoplastic vulcanizate, the method comprising the steps of: mixing a vulcanizable elastomer and at least one first thermoplastic resin above the melt temperature of the first thermoplastic resin to form a molten mass; adding a masterbatch consisting essentially of a second thermoplastic resin and a metal oxide to the molten mass; melting the second thermoplastic resin to disperse the metal oxide within the molten mass; adding a curative to the molten mass; and dynamically vulcanizing the elastomer with the curative in the presence of the metal oxide.

One or more embodiments further provide a method of making a thermoplastic vulcanizate, the method comprising the steps of: adding a poly(ethylene-propylene-diene)copolymer to a twin-screw extruder through the feed throat of the extruder; adding a polypropylene to the twin-screw extruder through the feed throat of the extruder; mixing, within an initial mix zone, the poly(ethylene-propylene-diene)copolymer and the polypropylene at a temperature above the melt temperature of the polypropylene to form a molten mass; adding a masterbatch consisting essentially of a polypropylene and a zinc oxide to the twin-screw extruder through an inlet in a barrel downstream of the initial mix zone; melting the polypropylene in the masterbatch and mixing the molten polypropylene with the molten mass; adding a phenolic resin curative to the twin-extruder through an inlet in a barrel downstream of the barrel where the masterbatch is added; mixing the phenolic resin curative with the molten mass while transferring the molten mass through a cure zone where dynamic vulcanization of the poly(ethylene-propylene-diene)copolymer takes place to form a thermoplastic vulcanizate; removing the thermoplastic vulcanizate from the twin-screw extruder; cooling the thermoplastic vulcanizate; and pelletizing the thermoplastic vulcanizate.

One or more embodiments of the present invention also provide thermoplastic vulcanizates made according to the method described herein.

DETAILED DESCRIPTION OF THE INVENTION

Described herein are thermoplastic vulcanizates ("TPVs") that can be prepared by a dynamic vulcanization process that includes curing an elastomer in the presence of a metal oxide that was delivered to the process as a masterbatch comprising the metal oxide and a thermoplastic resin.

I. Thermoplastic Vulcanizate Ingredients

Elastomer

The elastomers that may be employed to form the elastomeric phase of the TPV comprise those polymers that are capable of being cured or crosslinked. Reference to an elastomer or a rubber may comprise mixtures of more than one elastomer or rubber. Useful elastomers typically contain some degree of unsaturation in their polymeric main chain. Some non-limiting examples of these elastomers comprise elastomeric polyolefin copolymers, butyl rubber, natural rubber, styrene-butadiene copolymer rubber, butadiene rubber, acrylonitrile rubber, halogenated rubber such as brominated and chlorinated isobutylene-isoprene copolymer rubber, butadiene-styrene-vinyl pyridine rubber, urethane rubber, polyisoprene rubber, epicholorohydrin terpolymer rubber, and polychloroprene. In one or more embodiments, elastomeric polyolefin copolymers comprise ethylene-propylene rubbers, such as ethylene-propylene-non-conjugated-diene rubbers, or propylene-based rubbery copolymers containing units derived from non-conjugated diene monomers. In some preferred embodiments, the elastomer comprises, or consists essentially of, an ethylene-propylene rubber, such as an ethylene-propylene-non-conjugated-diene rubber.

Ethylene-Propylene Rubber

The term ethylene-propylene rubber refers to rubbery copolymers polymerized from ethylene, at least one α-olefin monomer, and at least one diene monomer. The α-olefins may comprise, but are not limited to, propylene, 1-butene, 1-hexene, 4-methyl-1-pentene, 1-octene, 1-decene, or combinations thereof. In some embodiments, the α-olefins comprise propylene, 1-hexene, 1-octene, or combinations thereof. In some preferred embodiments, the α-olefin comprises propylene. The diene monomers may comprise, but are not limited to, 5-ethylidene-2-norbornene; 5-vinyl-2-norbornene; divinylbenzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. In some preferred embodiments, the diene comprises 5-ethylidene-2-norbornene or 5-vinyl-2-norbornene. Copolymers prepared from ethylene, α-olefin, and diene monomers may be referred to as a terpolymer or even a tetrapolymer in the event that multiple α-olefins or dienes are used.

The ethylene-propylene rubber can comprises from about 12 to about 85% by weight, or from about 20 to about 80% by weight, or from about 40 to about 70% by weight, or from about 60 to about 66% by weight, ethylene-derived units based on the weight of the ethylene-propylene rubber. The ethylene-propylene rubber may comprise from about 0.1 to about 15% by weight, or from about 0.5 to about 12% by weight, or from about 1 to about 10% by weight, or from about 2 to about 8% by weight diene-derived units based on the weight of the ethylene-propylene rubber. The balance of units in the ethylene-propylene rubber include α-olefin-derived units (e.g., C3-C10 olefins such as propylene).

Expressed in mole percent, the ethylene-propylene rubber of some embodiments may comprise from about 0.1 to about 5 mole percent, or from about 0.5 to about 4 mole percent, or from about 1 to about 2.5 mole percent, diene-derived units. In embodiments where the diene comprises 5-ethylidene-2-norbornene, the ethylene-propylene rubber may comprise at least 1% by weight, or at least 3% by weight, or at least 4% by weight, or at least 5% by weight, or from about 1 to about 15% by weight, or from about 5% to about 12% by weight, or from about 7% to about 11% by weight units deriving from 5-ethylidene-2-norbornene. In embodiments where the diene comprises 5-vinyl-2-norbornene, the ethylene-propylene rubber may comprise at least 1% by weight, or at least 3% by weight, or at least 4% by weight, or at least 5% by weight, or from about 1 to about 15% by weight, or from about 5% to about 12% by weight, or from about 7% to about 11% by weight units deriving from 5-vinyl-2-norbornene.

The ethylene-propylene rubber may have a weight average molecular weight (Mw) that is greater than 100,000 g/mole, greater than 200,000 g/mole, greater than 400,000 g/mole, or greater than 600,000 g/mole. The Mw of the ethylene-propylene rubber may be less than 1,200,000 g/mole, less than 1,000,000 g/mole, less than 900,000 g/mole, or less than 800,000 g/mole.

Useful ethylene-propylene rubbers may have a number average molecular weight (Mn) that is greater than 20,000 g/mole, greater than 60,000 g/mole, greater than 100,000 g/mole, or greater than 150,000 g/mole. The Mn of the ethylene-propylene rubber may be less than 500,000 g/mole, less than 400,000 g/mole, less than 300,000 g/mole, or less than 250,000 g/mole.

Techniques for determining the molecular weight ($M_n$, $M_w$, and $M_z$) and molecular weight distribution (MWD) may be found in U.S. Pat. No. 4,540,753, which is incorporated by reference herein, and references cited therein and in *Macromolecules,* 1988, volume 21, p. 3360-3371 by Ver Strate et al., which is also herein incorporated by reference, and references cited therein.

In one or more embodiments, ethylene-propylene rubber may also be characterized by having a Mooney viscosity (ML (1+4) at 125° C.) per ASTM D-1646, of from about 10 to about 500, or from about 50 to about 450. Unless otherwise specified, Mooney viscosity is reported herein as ML (1+4@125° C.) in Mooney units according to ASTM D-1646, where the Mooney viscosity is reported using the format: Rotor ([pre-heat time, min.]+[shearing time, min.] @ measurement temperature, ° C.), such that ML (1+4@125° C.) indicates a Mooney viscosity determined using the ML or large rotor according to ASTM D1646, for a pre-heat time of 1 minute and a shear time of 4 minutes, at a temperature of 125° C. However, Mooney viscosity values greater than about 100 cannot generally be measured under these conditions. In this event, a higher temperature can be used (i.e., 150° C.), with eventual longer shearing time (i.e., 1+8@ 125° C. or 150° C.). Thus, for high Mooney viscosity polymers, the Mooney measurement may be carried out using a non-standard small rotor. The non-standard rotor design is employed with a change in the Mooney scale that allows the same instrumentation on the Mooney instrument to be used with polymers having a Mooney viscosity over about 100 ML(1+4@ 125° C.). For purposes herein, this modified Mooney determination is referred to as MST—Mooney Small Thin. ASTM D1646-99 prescribes the dimensions of the rotor to be used within the cavity of the Mooney instrument.

In some embodiments, the ethylene-propylene rubber may have an intrinsic viscosity, as measured in decalin at 135° C. per ASTM D-1601, of from about 1 to about 8 dl/g, or from about 3 to about 7 dl/g, or from about 4 to about 6.5 dl/g.

In some embodiments, the ethylene-propylene rubber may have a glass transition temperature ($T_g$), as determined by Differential Scanning calorimetry (DSC) according to ASTM E-1356, that is less than –20° C., less than –30° C., less than –50° C., or from about –20 to about –60° C.

Useful ethylene-propylene rubber may be manufactured or synthesized by using a variety of techniques. For example, these copolymers can be synthesized by employing solution, slurry, or gas phase polymerization techniques that employ various catalyst systems. Exemplary catalysts comprise Ziegler-Natta systems such as those including vanadium catalysts, and single-site catalysts including constrained geometry catalysts involving Group IV-VI metallocenes. Useful ethylene-propylene rubbers may be commercially available under the tradenames Vistalon™ (ExxonMobil Chemical Co.; Houston, Tex.), Keltan™ (DSM Copolymers), Nordel™ IP (Dow), NORDEL MG™ (Dow), Royalene™ (Lion Copolymer), and Buna™ (Lanxess).

Propylene-Based Rubbery Copolymer

In some embodiments, the elastomeric phase may comprise a propylene-based rubbery copolymer, which may also be referred to as propylene-α-olefin copolymers or propylene-based elastomers, that comprises units derived from propylene, one or more comonomer units derived from ethylene or C4-C20 α-olefins, and optionally one or more comonomer units derived from dienes. In some embodiments, the α-olefin comonomer units may derive from ethylene, 1-butene, 1-hexane, 4-methyl-1-pentene, and/or 1-octene. In some embodiments, the diene comonomer units may derive from 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. The embodiments described below are discussed with reference to ethylene as the α-olefin comonomer, but the embodiments are equally applicable to other copolymers with other α-olefin comonomers. In this regard, the copolymer may simply be referred to as propylene-based rubbery copolymers with reference to ethylene as the α-olefin.

The propylene-based rubbery copolymers may comprise at least 5% by weight, at least 6% by weight, at least 8% by weight, or at least 10% by weight ethylene-derived units, and the copolymers may comprise up to 35% by weight, up to 32% by weight, up to 25% by weight, or up to 20% by weight ethylene-derived units, based upon the total weight of the copolymer. Stated another way, the propylene-based rubbery copolymers may comprise at least 60% by weight or at least 80% by weight, propylene-derived units; and in these or other embodiments, the copolymers may comprise up to 95% by weight, up to 94% by weight, up to 92% by weight, or up to 90% by weight propylene-derived units, where based upon the total weight of the copolymer.

In some embodiments, the propylene-based rubbery copolymer may comprise at least 0.5% by weight, at least 1.5% by weight, or at least 3% by weight diene-derived units; in these or other embodiments, the propylene-based rubbery copolymers may comprise up to 11% by weight, up to 6% by weight, or up to 4% by weight diene-derived units, based upon the total weight of the copolymer.

The propylene-based rubbery copolymers may be characterized by having a single melting temperature as determined by differential scanning calorimetry (DSC). The melting point is defined as the temperature of the greatest heat absorption within the range of melting of the sample. The propylene-based rubbery copolymer may show secondary melting peaks adjacent to the principal peak, but for purposes herein, these secondary melting peaks are considered together as a single melting point, with the highest of these peaks being considered the melting point (Tm) of the propylene-based rubbery copolymer. In one or more embodiments, the Tm of the propylene-based rubbery copolymer is less than 110° C., less than 90° C., less than 80° C., or less than 70° C. The propylene-based rubbery copolymer may have a Tm of at least 25° C., at least of 35° C., at least of 40° C., or at least of 45° C. In some embodiments, the propylene-based rubbery copolymer exhibits no melting point.

In one or more embodiments, the propylene-based rubbery copolymer may have a heat of fusion (Hf), as determined according to DSC procedures according to ASTM E-793. This may be determined by placing 6 to 10 mg of sample into DSC equipment and heating the sample at about 10° C./min. In one or more embodiments, the propylene-based rubbery copolymer may have a heat of fusion of about 0 J/g, at least 0.5 J/g, at least 1.0 J/g, at least 1.5 J/g, at least 3.0 J/g, at least 4.0 J/g, at least 6.0 J/g, or at least 7.0 J/g. In these or other embodiments, the propylene-based rubbery copolymer may have a heat of fusion of less than 80 J/g, less than 70 J/g, less than 60 J/g, less than 50 J/g, less than 40 J/g, or less than 30 J/g.

The propylene-based rubbery copolymer can have a triad tacticity of propylene units, as measured by $^{13}$C NMR, of 75% or greater, 80% or greater, 82% or greater, 85% or greater, or 90% or greater. In some embodiments, the triad tacticity may range from about 50 to about 99%, from about 60 to about 99%, from about 75 to about 99%, from about 80 to about 99%, or from about 60 to about 97%. The triad tacticity may be determined by the methods described in U.S. Patent Application Publication No. 2004/0236042.

The propylene-based rubbery copolymer may have a percent crystallinity of from 0.5% to 40%, or from 1% to 30%, or from 5% to 25%. Crystallinity may be determined according to DSC procedures in accordance with ASTM E-794-95. This may be determined by placing 6 to 10 mg of sample into DSC equipment and heating the sample at about 10° C./min. For use herein, the crystallinity of the propylene-based rubbery copolymer can also be expressed in terms of percentage of crystallinity. The thermal energy for the highest order of polypropylene is estimated at 209 J/g (i.e., 100% crystallinity is equal to 209 J/g). In some embodiments, the propylene-ethylene polymer may have a crystallinity of less than 40%, of from about 0.25% to about 25%, of from about 0.5% to about 22%, or from about 0.5% to about 20%.

The propylene-based rubbery copolymer can have a density of about 0.85 g/cm$^3$ to about 0.92 g/cm$^3$, from about 0.87 g/cm$^3$ to 0.90 g/cm$^3$, or from about 0.88 g/cm$^3$ to about 0.89 g/cm$^3$ at room temperature as measured per the ASTM D-792 test method.

The propylene-based rubbery copolymer can have a melt index (MI) (ASTM D-1238, 2.16 kg @ 190° C.), of less than about 10 g/10 min, less than about 6.5 g/10 min, less than about 6 g/10 min, less than about 5.5 g/10 min, or less than about 5 g/10 min.

The propylene-based rubbery copolymer can have a melt flow rate (MFR) (ASTM D-1238, 2.16 kg @ 230° C.) of at least 0.2 g/10 min, at least 0.5 g/10 min, or at least 1.0 g/10 min. In some embodiments, the melt flow rate may be equal to or less than 350 g/10 min, or less than 100 g/10 min. In some embodiments, the propylene-based polymer has MFR of 0.5 g/10 min to 350 g/10 min, from 2 g/10 min to 30 g/10 min, from 5 g/10 min to 30 g/10 min, from 10 g/10 min to 30 g/10 min, or from 10 g/10 min to about 25 g/10 min.

The propylene-based rubbery copolymers may have a Mooney viscosity [ML(1+4)@125° C.], as determined according to ASTM D-1646, of less than 100, less than 75, less than 60, or less than 30.

The propylene-based rubbery copolymer can have a Mw of about 5,000 to about 5,000,000 g/mole, of about 10,000 to about 1,000,000 g/mole, of about 20,000 to about 500,000, g/mole, or of about 50,000 to about 400,000 g/mole.

The propylene-based rubbery copolymer can have a Mn of about 2,500 to about 2,500,000 g/mole, of about 5,000 to about 500,000 g/mole, of about 10,000 to about 250,000 g/mole, or of about 25,000 to about 200,000 g/mole.

The propylene-based rubbery copolymer can have a Z-average molecular weight (Mz) of about 10,000 to about 7,000,000 g/mole, of about 50,000 to about 1,000,000 g/mole, of about 80,000 to about 700,000 g/mole, or of about 100,000 to about 500,000 g/mole.

The molecular weight distribution index ($MWD=M_w/M_n$) of the propylene-based rubbery copolymer may be about 1 to about 40, about 1 to about 5, 1.8 to about 5, or about 1.8 to about 3.

Butyl Rubber

In some embodiments, the elastomeric phase of the TPV may comprise butyl rubber comprising copolymers and terpolymers of isobutylene and at least one other comonomer. Useful comonomers comprise isoprene, divinyl aromatic monomers, alkyl substituted vinyl aromatic monomers, and mixtures thereof. Exemplary divinyl aromatic monomers comprise vinylstyrene. Exemplary alkyl substituted vinyl aromatic monomers comprise α-methylstyrene and paramethylstyrene. These copolymers and terpolymers may also be halogenated such as in the case of chlorinated and brominated butyl rubber. In one or more embodiments, these halogenated polymers may derive from monomer such as parabromomethylstyrene.

In some embodiments, butyl rubber comprises copolymers of isobutylene and isoprene, and copolymers of isobutylene and paramethyl styrene, terpolymers of isobutylene, isoprene, and vinylstyrene, branched butyl rubber, and brominated copolymers of isobutene and paramethylstyrene (yielding copolymers with parabromomethylstyrenyl mer units). These copolymers and terpolymers may be halogenated.

In embodiments where the butyl rubber comprises the isobutylene-isoprene copolymer, the copolymer may comprise from about 0.5 to about 30, or from about 0.8 to about 5, percent by weight isoprene based on the entire weight of the copolymer with the remainder being isobutylene.

In embodiments where the butyl rubber comprises isobutylene-paramethylstyrene copolymer, the copolymer may comprise from about 0.5 to about 25, or from about 2 to about 20, percent by weight paramethylstyrene based on the entire weight of the copolymer with the remainder being isobutylene. In some embodiments, the isobutylene-paramethyl styrene copolymers can be halogenated, such as with bromine, and these halogenated copolymers can contain from about 0 to about 10 percent by weight, or from about 0.3 to about 7 percent by weight halogenation.

In embodiments where the butyl rubber comprises isobutylene-isoprene-divinylbenzene, the terpolymer may comprise from about 95 to about 99, or from about 96 to about 98.5, percent by weight isobutylene, and from about 0.5 to about 5, or from about 0.8 to about 2.5, percent by weight isoprene based on the entire weight of the terpolymer, with the balance being divinylbenzene.

In the case of halogenated butyl rubbers, the butyl rubber may comprise from about 0.1 to about 10, or from about 0.3 to about 7, or from about 0.5 to about 3 percent by weight halogen based upon the entire weight of the copolymer or terpolymer.

The Tg of useful butyl rubber can be less than about −55° C., or less than about −58° C., or less than about −60° C., or less than about −63° C.

The Mooney viscosity ($ML_{1+8}$@125° C.) of useful butyl rubber can be from about 25 to about 75, or from about 30 to about 60, or from about 40 to about 55.

Useful butyl rubber may include both halogenated and un-halogenated copolymers of isobutylene and isoprene available under the tradename Exxon Butyl™ (ExxonMobil Chemical Co.), halogenated and un-halogenated copolymers of isobutylene and paramethylstyrene available under the tradename EXXPRO™ (ExxonMobil Chemical Co.), star branched butyl rubbers available under the tradename STAR BRANCHED BUTYL™ (ExxonMobil Chemical Co.), and copolymers containing parabromomethylstyrenyl mer units available under the tradename EXXPRO 3745 (ExxonMobil Chemical Co.). Useful halogenated and non-halogenated terpolymers of isobutylene, isoprene, and divinylstyrene may also include those available under the tradename Polysar Butyl™ (Lanxess; Germany).

Thermoplastic Resin

The TPVs described herein comprise a thermoplastic phase that comprises one or more thermoplastic resins. The thermoplastic resin, also referred to as a thermoplastic polymer, that can be employed to form the thermoplastic phase may comprise those thermoplastic polymers that have been employed in the manufacture of thermoplastic vulcanizates as taught in the art. For example, these thermoplastic polymers, which may be referred to as unfunctionalized thermoplastics, may comprise solid, generally high molecular weight plastic resins. Exemplary thermoplastic polymers comprise crystalline, semi-crystalline, and crystallizable polyolefins, olefin copolymers, and non-olefin resins.

The thermoplastic resin may comprise propylene-based polymers including those solid, generally high-molecular weight plastic resins that primarily comprise units deriving from the polymerization of propylene. In certain embodiments, at least 75%, at least 90%, at least 95%, or at least 97% of the units of the propylene-based polymer derive from the polymerization of propylene. In particular embodiments, these polymers comprise homopolymers of propylene.

The thermoplastic resin may comprise one or more polypropylenes. Preferably, the polypropylene has a melting point above 110° C. and includes at least 90 wt % propylene-derived units. The polypropylene may also include isotactic, atactic or syndiotactic sequences, and preferably includes isotactic sequences. The polypropylene can either derive exclusively from propylene monomers (i.e., having only propylene-derived units) or comprises at least 90 wt %, or at least 93 wt %, or at least 95 wt %, or at least 97 wt %, or at least 98 wt %, or at least 99 wt % propylene-derived units with the remainder derived from olefins, such as ethylene, and/or $C_4$-$C_{10}$ α-olefins.

The thermoplastic resin can have a melt flow rate, as determined according to ASTM D-1238, 2.16 kg @ 230° C., of greater than about 0.1 g/10 min, and less than about 50 g/10 min, or less than about 40 g/10 min, or less than about 30 g/10 min, or less than 10 g/10 min, or less than 5 g/10 min, or less than 1 g/10 min, or can be within a range between any two values above. In some embodiments, the thermoplastic resin comprises a polypropylene having a fractional melt flow rate. For example, the thermoplastic resin may be a polypropylene having a melt flow rate (ASTM D-1238, 230° C., 2.16 kg) of from about 0.1 g/10 min to about 10.0 g/10 min, or from about 0.1 g/10 min to about 5.0 g/10 min, or from about 0.2 g/10 min to about 3.0 g/10 min, or from about 0.3 g/10 min to about 1.0 g/10 min.

The thermoplastic resin may comprise semi-crystalline polymers. In one or more embodiments, these polymers may be characterized by a crystallinity of at least 25% by weight, at least 55% by weight, at least 65%, and in other embodiments at least 70% by weight. Crystallinity may be determined by dividing the heat of fusion of a sample by the heat of fusion of a 100% crystalline polymer, which is assumed to be 209 joules/gram for polypropylene. In one or more embodiments, these polymers may be characterized by an Hf of at least 52.3 J/g, at least of 100 J/g, at least of 125 J/g, or at least of 140 J/g.

The thermoplastic resin can have a density of from about 0.89 to about 0.91 g/cc, or from about 0.90 to about 0.91 g/cc.

Useful thermoplastic resins can have a melt temperature (Tm) that is from about 110° C. to about 170° C., from about 140° C. to about 168° C., or from about 160° C. to about 165° C. They may have a glass transition temperature ($T_g$) of from about −10° C. to about 10° C., from about −3° C. to about 5° C., or from about 0° C. to about 2° C. In some embodiments, they may have a crystallization temperature (Tc) of at least about 75° C., at least about 95° C., at least about 100° C., at least 105° C., or ranging from 105° to 130° C.

The thermoplastic resins may be synthesized by using an appropriate polymerization technique known in the art such as, but not limited to, the conventional Ziegler-Natta type polymerizations, and catalysis employing single-site organometallic catalysts including, but not limited to, metallocene catalysts.

In certain embodiments, the thermoplastic resin may be a propylene-based polymer and may comprise propylene-derived units and units deriving from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof. For example, the thermoplastic resin may comprise propylene-derived units and at least 5% by weight, at least 6% by weight, at least 8% by weight, or at least 10% by weight ethylene-derived units, and the copolymers may comprise up to 35% by weight, up to 32% by weight, up to 25% by weight, or up to 20% by weight ethylene-derived units, based upon the total weight of the thermoplastic resin. Stated another way, the thermoplastic resin may comprise ethylene-derived units and at least 60% by weight or at least 80% by weight, propylene-derived units; and in these or other embodiments, the copolymers may comprise up to 95% by weight, up to 94% by weight, up to 92% by weight, or up to 90% by weight propylene-derived units, where based upon the total weight of the thermoplastic resin.

In such embodiments, where the thermoplastic resin comprises units derived from propylene and ethylene, the thermoplastic resin may be known as a propylene-based elastomer. The Tm of useful propylene-based elastomers may be less than about 110° C., less than 90° C., less than 80° C., or less than 70° C. The propylene-based elastomers may have a Tm of at least 25° C., at least of 35° C., at least of 40° C., or at least of 45° C. In one or more embodiments, the propylene-based elastomers may have a heat of fusion (Hf) of about 0 J/g, at least 0.5 J/g, at least 1.0 J/g, at least 1.5 J/g, at least 3.0 J/g, at least 4.0 J/g, at least 6.0 J/g, or at least 7.0 J/g. In these or other embodiments, the propylene-based elastomers may have a heat of fusion of less than 80 J/g, less than 70 J/g, less than 60 J/g, less than 50 J/g, less than 40 J/g, or less than 30 J/g. The propylene-based elastomers can have a triad tacticity of propylene units, as measured by $^{13}$C NMR, of 75% or greater, 80% or greater, 82% or greater, 85% or greater, or 90% or greater. In some embodiments, the triad tacticity may range from about 50 to about 99%, from about 60 to about 99%, from about 75 to about 99%, from about 80 to about 99%, or from about 60 to about 97%. The propylene-based elastomers may have a percent crystallinity of from 0.5% to 40%, or from 1% to 30%, or from 5% to 25%. The propylene-based elastomers can have a melt flow rate (MFR) (ASTM D-1238, 2.16 kg @ 230° C.) of at least 0.2 g/10 min, at least 0.5 g/10 min, or at least 1.0 g/10 min. In some embodiments, the melt flow rate may be equal to or less than 350 g/10 min, or less than 100 g/10 min. In some embodiments, the propylene-based elastomer has MFR of 0.5 g/10 min to 350 g/10 min, from 2 g/10 min to 30 g/10 min, from 5 g/10 min to 30 g/10 min, from 10 g/10 min to 30 g/10 min, or from 10 g/10 min to about 25 g/10 min.

Blends or mixtures of two or more thermoplastic resins such as described herein, or with other polymeric modifiers, may also be used. Useful thermoplastic polymers may also comprise impact and reactor copolymers.

The thermoplastic resin used to form the thermoplastic phase of the TPV may be referred to herein as a first thermoplastic resin or first thermoplastic polymer so as to be differentiated from the second thermoplastic resin that is part of the masterbatches described herein. In preferred embodiments, the first thermoplastic resin is substantially devoid of a metal oxide. The term "substantially devoid of" herein refers to the fact that the first thermoplastic resin comprises metal oxide in an amount of less than 1 wt %, or 0.8 wt %, or 0.5 wt %, or 0.3 wt %, or 0.1 wt %, or 0.05 wt %, or 0.01 wt %, by weight of the first thermoplastic resin, or may not contain any intentionally added metal oxide.

Masterbatch

As described herein, the TPV is formed utilizing a masterbatch that comprises metal oxide and a thermoplastic resin. The thermoplastic resin may be referred to as the second thermoplastic resin inasmuch as the method may include an additional thermoplastic resin feed (i.e., the first thermoplastic resin) in addition to the thermoplastic resin delivered with the masterbatch. The thermoplastic resin that is used in the masterbatch, i.e., the second thermoplastic resin, can be any of those as described in the "Thermoplastic Resin" section above. In some embodiments, the second thermoplastic resin can be the same resin employed as the first thermoplastic resin, or, in other embodiments, can be different from the first thermoplastic resin.

In preferred embodiments, the second thermoplastic resin can have a melt flow rate, as determined according to ASTM D-1238, 2.16 kg @ 230° C., of greater than about 0.1 g/10 min, and less than about 50 g/10 min, or less than about 40 g/10 min, or less than about 30 g/10 min, or less than 10 g/10 min, or less than 5 g/10 min, or less than 1 g/10 min, or can be within a range between any two values above. In some embodiments, the second thermoplastic resin is a polypropylene having a fractional melt flow rate. For example, the second thermoplastic resin can be a polypropylene having a melt flow rate (ASTM D-1238, 230° C., 2.16 kg) of from about 0.1 g/10 min to about 10.0 g/10 min, or from about 0.1 g/10 min to about 5.0 g/10 min, or from about 0.2 g/10 min to about 3.0 g/10 min, or from about 0.3 g/10 min to about 1.0 g/10 min.

In one or more embodiments, the masterbatch may be in the form of a particle or particles, which may also be referred to as pellets. Preferably, the particles or pellets are free-flowing. In some embodiments, the particles or pellets are characterized by an average diameter of from about 0.25 mm to about 10 mm, from about 0.5 mm to about 5 mm, and or from about 1 mm to about 4 mm.

The masterbatch may comprise at least 5 wt %, at least 10 wt %, at least 15 wt %, at least 20 wt %, at least 25 wt %, at least 30 wt %, at least 35 wt %, or at least 40 wt % of metal oxide, based on the weight of the masterbatch. The masterbatch may comprise less than 90 wt %, less than 85 wt %, less than 80 wt %, less than 75 wt %, less than 70 wt %, less than 65 wt %, less than 60 wt %, less than 55 wt %, or less than 50 wt % of metal oxide, based on the weight of the masterbatch. In some embodiments, the masterbatch may comprise from about 25 to about 75 wt %, from about 30 to about 70 wt %, from about 35 to about 65 wt %, or about 40 to about 60 wt. % metal oxide, based on the total weight of the masterbatch. In preferred embodiments, the balance of the masterbatch comprises a thermoplastic resin (i.e., the second thermoplastic resin).

Useful metal oxide can be selected from oxides of zinc, calcium, magnesium, aluminum, and ferrite. In some preferred embodiments, the metal oxide is zinc oxide.

Useful zinc oxide can have a mean particle diameter of about 0.01 μm to about 0.5 μm, or from about 0.05 μm to about 0.3 μm, or from about 0.08 μm to about 0.2 μm, or be within the range between any two values defined above in other embodiments. Examples of useful zinc oxides can include those commercially available under the tradenames Kadox™ 911 (Horsehead Corporation), Zoco™ 102 (Zochem), and AZO 77HSA (US Zinc Votorantim).

In some embodiments, the metal oxide and the second thermoplastic resin are further combined with other ingredients to form a masterbatch. For example, the masterbatch may further include an inert filler such as a clay or carbon black. In some embodiments, the masterbatch includes less than about 25 wt %, less than about 15 wt %, less than about 5 wt %, less than about 3 wt %, or less than about 1% by weight of material other than the metal oxide or the second thermoplastic resin, based on the weight of the masterbatch. In some embodiments, the masterbatch consists essentially of the metal oxide and thermoplastic resin.

Oils

The thermoplastic vulcanizates may comprise a plasticizer or process oil, such as a mineral oil, a synthetic oil, or combinations thereof. Mineral oils may comprise aromatic, naphthenic, paraffinic, and isoparaffinic oils. Useful oils can be obtained under the tradename SUNPAR™ (Sun Chemicals), or the name PARALUX™ (Chevron).

In some embodiments, the process oil may be a synthetic oils that comprises polymers and oligomers of butenes including isobutene, 1-butene, 2-butene, butadiene, and mixtures thereof. In one or more embodiments, these oligomers can be characterized by a number average molecular weight (Mn) of from about 300 g/mole to about 9,000 g/mole, or from about 700 g/mole to about 1,300 g/mole. In some embodiments, these oligomers comprise isobutylene mer units. Exemplary synthetic oils comprise polyisobutylene, poly(isobutylene-co-butene), and mixtures thereof. In some embodiments, synthetic oils may comprise polylinear α-olefins, poly-branched α-olefins, hydrogenated polyalphaolefins, and mixtures thereof.

Useful synthetic oils can comprise synthetic polymers or copolymers having a viscosity in excess of about 20 cp, in excess of about 100 cp, or in excess of about 190 cp, where the viscosity is measured by a Brookfield viscometer according to ASTM D-4402 at 38° C. In these or other embodiments, the viscosity of these oils can be less than 4,000 cp or less than 1,000 cp.

Useful synthetic oils can be commercially obtained under the tradenames Polybutene™ (Soltex; Houston, Tex.), and Indopol™ (Innouvene). White synthetic oil is available under the tradename SPECTRASYN™ (ExxonMobil). Oils described in U.S. Pat. No. 5,936,028 may also be employed.

In some embodiments, the oil may comprise organic esters, alkyl ethers, or combinations thereof, including those disclosed in U.S. Pat. Nos. 5,290,866 and 5,397,832. The organic esters and alkyl ether esters may have a molecular weight that is generally less than about 10,000. Suitable esters can comprise monomeric and oligomeric materials having an average molecular weight of below about 2,000 or below about 600. In some embodiments, the esters may be compatible or miscible with both the thermoplastic and rubber components of the composition; i.e., they may mix with other components to form a single phase. In some embodiments, the esters comprise aliphatic mono- or diesters, or alternatively oligomeric aliphatic esters or alkyl ether esters. In some embodiments, the TPVs are devoid of polymeric aliphatic esters and aromatic esters, as well as phosphate esters.

Polymeric Processing Additives

The thermoplastic vulcanizate may comprise a polymeric processing additive. The processing additive may be a polymeric resin that has a very high melt flow index. These polymeric resins comprise both linear and branched polymers that have a melt flow rate that is greater than about 500 g/10 min, greater than about 750 g/10 min, greater than about 1000 g/10 min, greater than about 1200 g/10 min, or greater than about 1500 g/10 min. Mixtures of various branched or various linear polymeric processing additives, as well as mixtures of both linear and branched polymeric processing additives, can be employed. Reference to polymeric processing additives can comprise both linear and branched additives unless otherwise specified. Linear polymeric processing additives comprise polypropylene homopolymers, and branched polymeric processing additives comprise diene-modified polypropylene polymers. Thermoplastic vulcanizates that comprise similar processing additives are further described in U.S. Pat. No. 6,451,915.

Curatives

Any curative that is capable of curing or crosslinking the elastomer may be used. Some non-limiting examples of these curatives comprise phenolic resins, peroxides, maleimides, and silicon-containing curatives.

Useful phenolic cure systems can be those described in U.S. Pat. Nos. 2,972,600, 3,287,440, 5,952,425 and 6,437,030. In some embodiments, phenolic resin curatives comprise resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms may be employed.

In some embodiments, a blend of octylphenol-formaldehyde and nonylphenol-formaldehyde resins is employed. The blend may comprise from about 25 to about 40 wt % octylphenol-formaldehyde and from about 75 to about 60 wt % nonylphenol-formaldehyde, or the blend comprises from about 30 to about 35 wt % octylphenol-formaldehyde and from about 70 to about 65 wt % nonylphenol-formaldehyde, or the blend comprises about 33 wt % octylphenol-formaldehyde and about 67 wt % nonylphenol-formaldehyde resin, where each of the octylphenol-formaldehyde and nonylphenol-formaldehyde comprise methylol groups. This blend can be solubilized in process oils, such as paraffinic oils, at about 30% solids without phase separation.

Useful phenolic resins may be obtained under the tradenames SP-1044, SP-1045 (Schenectady International; Schenectady, N.Y.), which may be referred to as alkylphenol-formaldehyde resins. SP-1045 is believed to be a blend of octylphenol and nonylphenol formaldehyde resins that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

An example of a useful phenolic resin curative comprises that defined according to the general formula:

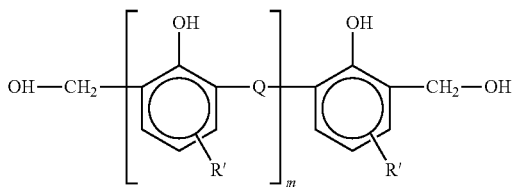

where Q is a divalent radical selected from the group consisting of —$CH_2$—, —$CH_2$—O—$CH_2$—; is zero or a positive integer from 1 to 20 and R' is an organic group. In some embodiments, Q is the divalent radical —$CH_2$—O—$CH_2$—, m is zero or a positive integer from 1 to 10, and R' is an organic group having less than 20 carbon atoms. In other embodiments, m is zero or a positive integer from 1 to 10 and R' is an organic radical having between 4 and 12 carbon atoms.

The phenolic resin can be added into the process for forming the TPV in a form of phenolic resin-in-oil ("RIO"), where the phenolic resin has been dispersed and/or dissolved in an oil, such as a mineral oil. For example, the mineral oil can comprise aromatic mineral oils, naphthenic mineral oils, and paraffinic mineral oils. The method of dispersing and/or dissolving the phenolic resin in a mineral oil may be any method known in the art.

In some embodiments, the phenolic resin may be used in conjunction with a cure accelerator such as stannous chloride. The stannous chloride can be used in its hydrous ($SnCl_2H_2O$) or anhydrous ($SnCl_2$) form. In particular embodiments, the stannous chloride is an anhydrous stannous chloride. The stannous chloride can be used in a powdered, granulated, or flake form. In some embodiments, the stannous chloride may be introduced to the vulcanization process as part of a masterbatch. The masterbatch may comprise stannous chloride and a third thermoplastic resin. The third thermoplastic resin may be the same resin employed as the first and/or second thermoplastic resin, or the third thermoplastic resin may be distinct from the first and/or second thermoplastic resin. Disclosure of addition of stannous chloride in masterbatch pellet form can be found in U.S. Patent Application Publication No. 2011/160402 A1.

In some embodiments, the phenolic resin can be used in conjunction with an acid scavenger, such as a hydrotalcite, which may be added downstream of cure. Useful acid scavengers comprise hydrotalcite. Both synthetic and natural hydrotalcites can be used. An exemplary natural hydrotalcite can be represented by the formula $Mg_6Al_2(OH)_{16}CO_3 4H_2O$. Synthetic hydrotalcite compounds, which are believed to have the formula $Mg_43Al_2(OH)_{12} 6CO_3 mH_2O$ or $Mg_45Al_3(OH)_{13}CO_3 35H_2O$, can be obtained under the tradenames DHT-4A or Kyowaad 1000 (Kyowa Chemical Industry Co., Japan). Another commercial example is that available under the tradename Alcamizer (Kyowa).

Other Constituents

In addition to the elastomer, thermoplastic resins, metal oxide masterbatch, and optional processing additives, the thermoplastic vulcanizates may optionally comprise one or more compatibilizers, calcined clay, kaolin clay, nanoclay, talc, silicates, carbonates, sulfates, carbon black, sand, glass beads, mineral aggregates, wollastonite, mica, glass fiber, other filler, pigments, colorants, dyes, carbon black, dispersants, flame retardants, antioxidants, conductive particles, UV-inhibitors, UV-stabilizers, adhesion promoters, fatty acids, esters, paraffin waxes, neutralizers, metal deactivators, tackifiers, calcium stearate, desiccants, stabilizers, light stabilizers, light absorbers, coupling agents including silanes and titanates, plasticizers, blocking agents, antiblocking agents, antistatic agents, waxes, foaming agents, nucleating agents, slip agents, acid scavengers, lubricants, adjuvants, surfactants, crystallization aids, polymeric additives, defoamers, preservatives, thickeners, rheology modifiers, humectants, vulcanizing/cross-linking/curative agents, vulcanizing/cross-linking/curative accelerators, cure retarders, reinforcing and non-reinforcing fillers, and combinations thereof, and other processing aids known in the rubber compounding art. These additives can comprise up to about 50 weight percent of the total TPV. In some embodiments, fillers and extenders that can be utilized comprise conventional inorganics such as calcium carbonate, clays, silica, talc, titanium dioxide, carbon black, and the like.

Amounts

The thermoplastic vulcanizates can include at least about 25 wt %, at least about 45 wt %, at least about 65 wt %, or at least about 75 wt % of elastomer based upon the total weight of the TPV. In some embodiments, the TPV may comprise from about 15 to about 90 wt %, from about 45 to about 85 wt %, or from about 60 to about 80 wt %, of the elastomer based on the combined weight of the elastomer and thermoplastic resin.

The total amount of thermoplastic resin (i.e., uncured polymer within the thermoplastic phase, including resins added from the masterbatch of metal oxide) within the thermoplastic vulcanizates can be from about 10 to about 85 wt %, from about 10 to about 40 wt %, or from about 12 to about 30 wt %, based on the combined weight of the elastomer and thermoplastic resin.

In some embodiments, the total amount of thermoplastic resin added to the TPV, including thermoplastic resin added by means of the masterbatch, may be from about 25 to about 250 parts by weight, from about 50 to about 150 parts by weight, or from about 60 to about 100 parts by weight, per 100 parts by weight elastomer added to TPV.

The metal oxide added to the TPV through the masterbatch can be at least about 0.25 parts, or at least about 0.3 parts, or at least about 0.5 parts, or at least about 0.8 parts, or at least about 1.0 parts by weight per 100 parts by weight elastomer added; and can be equal to or less than about 5.0 parts, or equal to or less than about 4.0 parts, or equal to or less than about 3.0 parts, by weight per 100 parts by weight elastomer added. In some embodiments, the TPV may comprise from about 0.25 to about 5.0, from about 0.3 to about 3.0, or from about 0.5 to about 2.5 parts by weight of the metal oxide per 100 parts by weight elastomer. In some embodiments, the TPV may comprise from about 0.1 wt % to about 3.0 wt %, or from about 0.15 wt % to about 2.0 wt %, or from about 0.2 wt % to about 1.5 wt %, of metal oxide by weight of the TPV.

In one or more embodiments, the process oil added to the thermoplastic vulcanization compositions can be from about 25 to about 250 parts by weight, or from about 50 to about 150 parts by weight, or from about 75 to about 130 parts by weight per 100 parts by weight elastomer added. The quantity of extender oil added may depend upon the properties desired, with the upper limit depending upon the compatibility of the particular oil and blend ingredients; this limit is exceeded when excessive exuding of extender oil occurs. The amount of extender oil may depend, at least in part, upon the type of elastomer. High viscosity elastomers are more highly oil extendable.

The skilled artisan will be able to readily determine a sufficient or effective amount of curative to be employed without undue calculation or experimentation. The amount of curative should be sufficient to at least partially vulcanize the elastomeric polymer, and the elastomeric polymer may be completely vulcanized. Where a phenolic resin curative is employed, the curative may be added from about 1 to about 20 parts by weight, or from about 3 to about 16 parts by weight, or from about 4 to about 12 parts by weight, phenolic resin per 100 parts by weight elastomer.

Fillers, such as carbon black, clay, talc, or calcium carbonate may be added in amount from about 1 to about 250 parts by weight, from about 10 to about 150 parts by weight, or from about 25 to about 50 parts by weight, per 100 parts by weight of elastomer.

When employed, acid scavengers, such as hydrotalcite, may be employed in an amount from 0.1 to 5% by weight, from 0.2 to 3% by weight, or from 0.5 to 1.0% by weight based on the total weight of the TPV.

II. Dynamic Vulcanization Method

The method of the present invention includes dynamic vulcanization of an elastomer in the presence of a metal oxide masterbatch comprising thermoplastic resin (also referred to as a second thermoplastic resin). As those skilled in the art appreciate, dynamic vulcanization includes a process whereby an elastomer that is undergoing mixing with a thermoplastic resin is cured. In one or more embodiments, the elastomer may be crosslinked or vulcanized under conditions of high shear at a temperature above the melting point of the thermoplastic. As a result of the process, the thermoplastic phase becomes the continuous phase of the mixture. In preferred embodiments, the elastomer phase becomes a discontinuous phase of the mixture. In some embodiments, the elastomer undergoes a phase inversion during dynamic vulcanization, where the blend, which initially includes a major volume fraction of elastomer, is converted to a blend where the thermoplastic phase is the continuous phase. The elastomer can be simultaneously crosslinked and dispersed as fine particles within the thermoplastic matrix, although other morphologies may also exist.

In general, the dynamic vulcanization takes place within a reactor, such as a reaction extruder. In some embodiments, the elastomer and the thermoplastic resin (or "plastic") are introduced to the reactor as solids. The elastomer and plastic are then mixed at a temperature above the melt temperature of the thermoplastic resin. Following this initial blending, the curative is introduced to the blend and curing of the elastomer proceeds.

According to the present invention, metal oxide is introduced to the reactor as a masterbatch with a second thermoplastic resin. In one or more embodiments, the masterbatch of metal oxide and the second thermoplastic resin is in the form of solid pellets. The masterbatch can be introduced to the reactor together with the introduction the elastomer and/or the first thermoplastic resin. In other embodiments, these masterbatch can be introduced after the elastomer and/or the first thermoplastic resin are fed, together with or without other ingredients. The masterbatch may then undergo mixing with the elastomer and thermoplastic resin at elevated temperatures, which may include temperatures at or above the melt temperature of the second thermoplastic resin(s).

The method of some embodiments can be described with reference to FIG. 1. The method 10 comprises adding an elastomer or rubber 12 and first thermoplastic resin 14 and metal oxide masterbatch 20 to a reactor to form blend 16, which may be referred to as a solids blend 16, although not all components of the blend need to be in the solid state. Other solid ingredients can be added to the blend 16 such as fillers 22, stannous chloride 24, and other miscellaneous solids 26, such as pigments and antioxidants. These ingredients 22, 24, and 26 can be pre-blended with other solids, such as the rubber, prior to blending with the other ingredients, or they may be separately combined with the other solid ingredients to form solids blend 16.

Blend 16 is continually mixed at a temperature above the melt temperature of first thermoplastic resin 14 to form molten blend 30. A curative 32, such as phenolic resin is introduced to molten blend 30 to form vulcanizable blend 34. Heating and mixing continues in order to effect dynamic vulcanization 36.

Despite of the illustration in FIG. 1, the present method is not limited to any specific addition orders for forming the blend of elastomer 12, thermoplastic resin 14, metal oxide masterbatch 20, and other optional ingredients 22, 24, and 26. For example, while not shown in FIG. 1, elastomer 12 and resin 14 can be added first to form a blend, followed by addition of masterbatch 20 to the blend 16 or to a molten mass of the blend; and other ingredients 22, 24, and 26, if applicable, can be added to the blend or to a molten mass of the blend before, simultaneously with, or after addition of masterbatch 20. In other embodiments not illustrated in FIG. 1, the metal oxide masterbatch 20 can be added with elastomer 12 first to form a blend, followed by addition of thermoplastic resin 14 to the blend, or to a molten mass of the blend, and other ingredients 22, 24, and 26, if applicable, can be added to the blend or to a molten mass of the blend before, simultaneously with, or after addition of resin 14.

Referring again to FIG. 1, Process oil 38 can be introduced at any stage, or in multiple stages, of the process. For example, oil 38 can be added to solids blend 16, to molten blend 30, together with curative 32, or after dynamic vulcanization 36.

Following dynamic vulcanization 36, mixing may continue and additional additives or ingredients can be incorporated into the molten product, which may be referred to as a molten thermoplastic vulcanizate. For example, post vulcanization additives 39, such as acid scavengers, can be added to the molten mass following dynamic vulcanization 36. The product, can then be extruded through an extruder die 40, or otherwise fabricated, and ultimately cooled for handling. Further manufacturing and processing of the thermoplastic vulcanizate may proceed in a conventional manner. For example, the molten thermoplastic vulcanizate composition may be cooled and/or solidified and subsequently pelletized for future storage and/or shipment. Practice of the present invention is not necessarily limited by the manner in which the thermoplastic vulcanizate composition is subsequently solidified or fabricated.

The method of dynamic vulcanization can take place in a continuous mixing reactor, which may also be referred to as a continuous mixer. Continuous mixing reactors may include those reactors that can be continuously fed ingredients and that can continuously have product removed therefrom. Examples of continuous mixing reactors include twin screw or multi-screw extruders (e.g., ring extruder). Useful methods and equipment for continuously preparing thermoplastic vulcanizates are described in U.S. Pat. Nos. 4,311,628; 4,594,390; 5,656,693; 6,147,160; and 6,042,260, as well as PCT Publication No. WO2004/009327 A1, although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed.

III. Thermoplastic Vulcanizate Characteristics

The thermoplastic vulcanizate composition comprises a continuous thermoplastic phase with a cured elastomer phase dispersed therein. The elastomer can be partly or fully cured. The degree of cure can be measured by determining the amount of elastomer that is extractable from the TPV by using cyclohexane or boiling xylene as an extractant. These methods are disclosed in U.S. Pat. Nos. 4,311,628, 5,100,947 and 5,151,081. Preferably, the rubber has a degree of cure where less than 15 weight percent, less than 10 weight percent, less than 5 weight percent, or less than 3 weight percent of the rubber is extractable by cyclohexane at 23° C. Alternatively, the rubber has a degree of cure such that the crosslink density is preferably at least $4 \times 10^{-5}$, at least $7 \times 10^{-5}$, at least $10 \times 10^{-5}$ moles per milliliter of rubber. See also "Crosslink Densities and Phase Morphologies in Dynamically Vulcanized TPEs," by Ellul et al., RUBBER CHEMISTRY AND TECHNOLOGY, Vol. 68, pp. 573-584 (1995).

Despite the fact that the elastomer may be fully cured, the TPVs produced by the present method can be processed and reprocessed by conventional plastic processing techniques such as extrusion, injection molding, blow molding, and compression molding. The elastomer within these thermoplastic elastomers can be in the form of finely-divided and well-dispersed particles of vulcanized or cured elastomer within a continuous thermoplastic phase or matrix. In other embodiments, a co-continuous morphology may exist. In those embodiments where the cured elastomer is in the form of finely-divided and well-dispersed particles within the thermoplastic medium, the elastomer particles can have an average diameter that is less than 50 µm, less than 30 µm, less than 10 µm, less than 5 µm, or less than 1 µm. In certain embodiments, at least 50%, at least 60%, or at least 75% of the particles have an average diameter of less than 5 µm, less than 2 µm, or less than 1 µm.

In the present invention, by utilizing a masterbatch comprising the metal oxide and thermoplastic resin, the metal oxide can be encapsulated within the thermoplastic resin and thereby can have less affinity to metal surfaces of a feeder into the reaction extruder. This can also reduce or eliminate unwanted compaction of metal oxide and blockage of the feeder. The masterbatch feed of metal oxide also provides a more efficient method for metering more precise amounts of the metal oxide to the composition. Further, it has been discovered that the use of metal oxide masterbatch can allow more even dispersion of the metal oxide throughout the vulcanizable composition and thereby achieve an improved cross link or cure of the elastomer. Likewise, the masterbatch may advantageously shield the metal oxide from participating in undesirable side reactions. As a result of the above described improvements, the need to feed excess metal oxide to the process can be avoided, which is especially advantageous as related to large commercial processes where excess powdered metal oxide was often needed to provide the needed level of cure.

The thermoplastic vulcanizate can have a Shore A hardness from 30 to 100, from 40 to 95, or from 50 to 90, wherein a desirable range may comprise any combination of any lower limit with any upper limit described herein. Shore hardness can be determined based on method ASTM D-2240.

The thermoplastic vulcanizate can have an ultimate tensile strength, determined based on method ASTM D-412, of from 3.0 MPa to 30.0 Mpa, or from 5.0 Mpa to 25.0 Mpa, or from 5.5 to 10 Mpa, or from 6.0 to 8.0 Mpa, wherein a desirable range may comprise any combination of any lower limit with any upper limit described herein.

The thermoplastic vulcanizate can have a modulus at 100% extension, determined based on method ASTM D-412, of from 1.0 Mpa to 10.0 Mpa, or from 1.5 Mpa to 9.0 Mpa, from 2.5 Mpa to 8.0 Mpa, or from 3.0 to 5.0 Mpa, wherein a desirable range may comprise any combination of any lower limit with any upper limit described herein.

The thermoplastic vulcanizate can have an elongation at break, determined based on method ASTM D-412, of from 100% to 800%, or from about 200% to 750%, or from 300% to 700%, or from 400% to 600%, wherein a desirable range may comprise any combination of any lower limit with any upper limit described herein.

The thermoplastic vulcanizate may have a LCR viscosity at 1200 l/s, determined based on method ASTM D-3835, of from about 50 Pa·s to about 150 Pa·s, and from about 70 Pa·s to 100 Pa·s, or from about 80 Pa·s to 90 Pa·s, wherein a desirable range may comprise any combination of any lower limit with any upper limit described herein.

The thermoplastic vulcanizate may have a weight gain (oil swell) determined according to ASTM D-471 at 24 h@ 121° C., of from 40% to 150%, from 45% to 110%, or from 45% to 90%, wherein a desirable range may comprise any combination of any lower limit with any upper limit described herein.

IV. Industrial Applicability

The thermoplastic vulcanizate made by method of the present invention can have a variety of uses as is known in the art. Practice of the present invention does not necessarily limit the intended or expected uses of the thermoplastic vulcanizates. As is known in the art, thermoplastic vulcanizates of this invention are useful for making a variety of articles such as weather seals, hoses, belts, gaskets, moldings, boots, elastic fibers, and like articles. They are useful for making articles by blow molding, extrusion, injection molding, thermo-forming, elasto-welding and compression molding techniques. More specifically, they are useful for making vehicle parts such as weather seals, brake parts such as cups, coupling disks, and diaphragm cups, boots for constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

EXAMPLES

In order to demonstrate the practice of the present invention, the following examples have been prepared and tested. The examples should not, however, be viewed as limiting the scope of the invention.

Test Methods

Specific gravity was determined according to ASTM D-792. Shore A and Shore D hardness were determined according to ISO 868. Data for modulus at 100% extension ("M100"), ultimate tensile strength ("UTS") and elongation at break ("UE"), were determined according to ISO 37 at 23° C. (unless otherwise specified) at 50 mm per minute by using an Instron testing machine. "LCR" is a measurement of viscosity in Pa·sec at 1200 sec$^{-1}$ shear rate using Lab Capillary Rheometer from Dynisco, per method described in ASTM D 3835.

"WtGn %" is a measurement of the amount of oil absorbed by the sample in an oil swell resistance test. The test is based on ASTM D-471, and requires a sample of thermoplastic vulcanizates to be immersed in IRM 903 oil for 24 hours at 121° C. The weight gain percentage is a measure of the completeness of the cross-linking of the vulcanizate. Although weight gain values can vary depending on whether or not the elastomer is oil extended, and how much, in thermoplastic vulcanizates having the same composition, the values show the amount of cross-linking of the vulcanizates relative to each other.

Color "1", "a" and "b" test method is as follows: LabScan (Registered Trademark) XE reflectance spectrometer from HunterLab was used to measure color. Statistically designed experiments varying ingredients, and statistical analysis of variance (ANOVA) for effects on compound cure, physical and color properties were made. An explanation of the color measurements, based on the Hunter color scheme (0, black; 100, white; +a, red; −a, green; +b, yellow; −b, blue), can be found in 8(9) Applications Note, 1-15 (Hunter Associates Laboratory, Inc., August 1996).

Comparative Examples 1-3 and Examples 1-5

Thermoplastic vulcanizates were prepared within a twin-screw extruder generally having a length/diameter (L/D) ratio of about 40. Three comparative samples (C1 to C3) were prepared by introducing zinc oxide powder to the extruder via a powder feeder. Five inventive samples (E1 to E5) were prepared by introducing a masterbatch of zinc oxide and polypropylene to the extruder in pellet form via a pellet feeder.

In these examples, ingredients were added at different locations along the length of the extruder as shown in Table 1. The barrel column in Table 1 indicates location of addition of various ingredients: "RB", i.e., rubber blend refers to an addition at feed throat of the extruder, "1" refers to first barrel section next to the feed throat, "2M", "8M", and "11M" refer to the middle of barrel sections 2, 8, and 11 next to the feed throat, respectively.

The amounts of the ingredients that were employed are set forth in Table 1. All amounts in Table 1 are listed in phr, parts per 100 parts of rubber (elastomer). The results of various physical tests that were performed on the resultant thermoplastic vulcanizates are shown in Table 2.

The rubber that was employed was an oil-extended EPDM, poly(ethylene-co-propylene-co-5-ethylidene-2-norbornene), having an ethylene content of about 64 wt., a diene content of about 4.5 wt %, and an extender oil content of 75 phr. The EPDM was characterized by an oil-extended Mooney viscosity $ML_{(1+4)}$@125° C. of about 52. The EPDM used was obtained under the tradename Vistalon™ 3666 (ExxonMobil Chemical Company). The parts by weight in Table 1 of the EPDM refers to the amount of rubber and extender oil. Thus, as seen in Table 175 phr of Vistalon™ 3666 was used, where 100 phr was EPDM and 75 phr was oil.

The curative used was a phenolic resin-in-oil obtained under tradename SMD-31215S (SI Group).

The thermoplastic resins used were obtained under tradenames Moplen™ HP556E polypropylene having a melt flow rate (230° C., 2.16 kg) of about 0.8 g/10 min (LyondellBasell), BC245MO polypropylene having a melt flow rate (230° C., 2.16 kg) of about 3.5 g/10 min (Borealis), and HF136MO polypropylene having a melt flow rate (230° C., 2.16 kg) of about 20 g/10 min (Borealis).

The process oil used was paraffinic oil obtained under the tradename Plastol™ 537 (ExxonMobil). The process oil used was introduced to the extruder at two different locations (Oil #1 and Oil #2).

The filler was clay obtained under the tradename Icecap K™ (Burgess).

The black concentrate was a commercial blend obtained under the tradename PP40454 Black MB (Cabot).

The masterbatch of stannous chloride and polypropylene comprised 45% by weight stannous chloride based upon the total weight of the masterbatch, with the balance being polypropylene.

The zinc oxide powder was obtained under tradename Zoco™ 102 (Zochem) and has an average size of 0.11μ to 0.13 μm. The masterbatch of zinc oxide was a pelletized blend of zinc oxide under tradename Zoco™ 102 (Zochem) and polypropylene under tradename Braskem™ F008F having a melt flow rate (230° C., 2.16 kg) of 0.80 g/10 min. The zinc oxide masterbatch was prepared in a 70 mm twin screw mixer and contained about 50 wt % of the zinc oxide with the balance being the polypropylene.

TABLE 1

Thermoplastic Vulcanizate Ingredients

| Ingredient | Barrel# | C1 | E1 | C2 | E2 | E3 | C3 | E4 | E5 |
|---|---|---|---|---|---|---|---|---|---|
| EPDM | RB | 175.00 | 175.00 | 175.00 | 175.00 | 175.00 | 175.00 | 175.00 | 175.00 |
| Clay | RB | 12.00 | 12.00 | 42.00 | 42.00 | 42.00 | 42.00 | 42.00 | 42.00 |
| Zinc oxide | RB | 1.50 | — | 2.00 | — | — | 2.00 | — | — |
| ZnO Masterbatch | 1 | — | 3.00 | — | 4.00 | 3.20 | — | 4.00 | 3.20 |
| SnCl2 Masterbatch | 1 | 2.11 | 2.11 | 1.67 | 1.67 | 1.67 | 1.67 | 1.67 | 1.67 |
| HP556E PP | 1 | | | 34.91 | 32.91 | 33.31 | 222.06 | 220.06 | 220.46 |
| BC245MO PP | 1 | 38.85 | 37.73 | — | — | — | — | — | — |
| HF136MO PP | 1 | — | — | 10.32 | 10.32 | 10.32 | — | — | — |
| Black MB | 1 | 21.36 | 21.36 | — | — | — | — | — | — |
| Phenolic RIO | 8M | 7.30 | 7.30 | 10.49 | 10.49 | 10.49 | 14.00 | 14.00 | 14.00 |
| Oil #1 | 2M | 36.05 | 36.05 | 5.08 | 5.08 | 5.08 | 4.87 | 4.87 | 4.87 |
| Oil# 2 | 11M | 62.50 | 62.50 | 45.76 | 45.76 | 45.76 | 43.83 | 43.83 | 43.83 |
| TOTAL PHR | | 356.67 | 357.05 | 327.23 | 327.23 | 326.83 | 505.43 | 505.43 | 505.03 |

TABLE 2

Thermoplastic Vulcanizate Properties

| | C1 | E1 | C2 | E2 | E3 | C3 | E4 | E5 |
|---|---|---|---|---|---|---|---|---|
| ShoreA | 57.6 | 58.1 | 69.5 | 70.5 | 70.0 | — | — | — |
| ShoreD | — | — | — | — | — | 40.5 | 38.4 | 38.6 |
| Specific Gravity (g/cm$^3$) | 0.9317 | 0.9281 | 0.9696 | 0.9675 | 0.9659 | 0.9420 | 0.9453 | 0.9422 |
| WtGn (%) | 112.2 | 109.5 | 91.6 | 80.8 | 83.1 | 47.5 | 46.6 | 47.4 |
| UTS (MPa) | 3.71 | 3.71 | 6.94 | 6.99 | 6.84 | 19.58 | 19.20 | 18.54 |
| M100 (MPa) | 1.66 | 1.61 | 2.68 | 2.88 | 2.82 | 8.71 | 8.70 | 8.59 |
| UE (MPa) | 461 | 445 | 469 | 432 | 435 | 641 | 639 | 626 |
| LCR (Pa·s) | 48.85 | 50.77 | 88.70 | 89.45 | 89.65 | 97.48 | 97.28 | 96.71 |
| Col_l | — | — | 70.35 | 71.29 | 70.88 | 67.84 | 66.97 | 66.68 |
| Col_a | — | — | 1.54 | 1.22 | 1.37 | 1.28 | 1.96 | 2.03 |
| Col_b | — | — | 10.31 | 10.81 | 9.95 | 12.44 | 12.47 | 12.90 |

The data in Table 2 show that the thermoplastic vulcanizates obtained when zinc oxide was introduced to the extruder via a powder feeder or by way of a masterbatch using a pellet feeder had comparable physical properties. These results are significant because as those skilled in the art appreciate, powder feeding suffers from many drawbacks that are not experienced by pellet feeding. For example, feeding zinc oxide to an extruder by way of a powder feeder can result in blockage of the powder feeder because of the zinc oxide's affinity to metal surfaces. However, utilizing a zinc oxide masterbatch pellet can avoid such issues, while obtaining thermoplastic vulcanizates having comparable physical properties. The present invention therefore offers a significant technological advantage.

The data in Table 2 also shows that the thermoplastic vulcanizates made by means of using the zinc oxide masterbatch, as compared with zinc oxide powder, can exhibit lowered weight gain, i.e., improved oil swell resistance properties. This can indicate improved cross link densities of the TPV, and thus, that the zinc oxide was more effectively dispersed within the TPV.

Having described the various aspects of the compositions and methods described herein, further specific embodiments of the invention may include those set forth in the following paragraphs.

Embodiment A

A method of making a thermoplastic vulcanizate, the method comprising the steps of: adding or introducing vulcanizable elastomer to a reactor; adding or introducing a masterbatch comprising thermoplastic resin and metal oxide to the reactor; adding or introducing curative to the reactor; and dynamically vulcanizing the elastomer in the presence of the curative and the metal oxide.

Embodiment B

The method of Embodiment A, further comprising the step of mixing the vulcanizable elastomer and the masterbatch above the melt temperature of the thermoplastic resin.

Embodiment C

The method of Embodiment A or B, further comprising the step of adding or introducing to the reactor a thermoplastic resin substantially devoid of metal oxide.

Embodiment D

The method of any one of Embodiments A to C, wherein the metal oxide is at least one oxide of a zinc, calcium, magnesium, aluminum, and ferrite.

Embodiment E

The method of any one of Embodiments A to D, wherein the metal oxide is zinc oxide.

Embodiment F

The method of any one of Embodiment E, wherein the zinc oxide has a mean particle diameter of from about 0.01 μm to about 0.5 μm.

Embodiment G

The method of any one of Embodiments A to F, wherein the curative is selected from a phenolic resin and a silicone-containing curative.

Embodiment H

The method of any one of Embodiments A to G, wherein the masterbatch comprises from about 25 wt % to about 75 wt % of the metal oxide based on the weight of the masterbatch.

Embodiment I

The method of any one of Embodiments A to H, wherein the masterbatch comprises about 40 wt % to about 60 wt % of the metal oxide based on the weight of the masterbatch.

Embodiment J

The method of any one of Embodiments A to I, wherein the masterbatch comprises less than 25 wt % of material other than the metal oxide or the thermoplastic resin based on the weight of the masterbatch.

Embodiment K

The method of any one of Embodiments A to I, wherein the masterbatch comprises less than 5 wt % of material other than the metal oxide or the thermoplastic resin based on the weight of the masterbatch.

Embodiment L

The method of any one of Embodiments A to I, wherein the masterbatch consists essentially of the metal oxide and thermoplastic resin.

Embodiment M

The method of any one of Embodiments A to L, wherein the masterbatch is added to the reactor in the form of pellets.

Embodiment N

The method of any one of Embodiments A to M, wherein the thermoplastic resin in the masterbatch comprises polypropylene.

Embodiment O

The method of any one of Embodiments A to N, wherein the thermoplastic resin in the masterbatch has a melt flow rate, as determined according to ASTM D-1238 at 230° C., 2.16 kg, of from about 0.1 g/10 min to about 50.0 g/10 min.

Embodiment P

The method of any one of Embodiments C to O, wherein the thermoplastic resin in the masterbatch is the same as the thermoplastic resin substantially devoid of the metal oxide.

Embodiment Q

The method of any one of Embodiments A to P, wherein the metal oxide in the masterbatch is added in an amount from about 0.25 to about 5.0 parts by weight per 100 parts by weight elastomer.

Embodiment R

The method of any one of Embodiments A to Q, wherein the metal oxide in the masterbatch is added in an amount from about 0.5 to about 4.0 parts by weight per 100 parts by weight elastomer.

Embodiment S

A method of making a thermoplastic vulcanizate, the method comprising the steps of:
a. mixing a vulcanizable elastomer and at least one first thermoplastic resin above the melt temperature of the first thermoplastic resin to form a molten mass;
b. adding a masterbatch comprising a second thermoplastic resin and a metal oxide to the molten mass;
c. melting the second thermoplastic resin to disperse the metal oxide within the molten mass;
d. adding a curative to the molten mass; and
e. dynamically vulcanizing the elastomer in the presence of the curative and the metal oxide.

Embodiment T

The method of Embodiment S, where the vulcanizable elastomer is a poly(ethylene-propylene-diene)copolymer, the first thermoplastic resin is polypropylene, and the second thermoplastic resin is polypropylene.

Embodiment U

The method of Embodiment S or T, wherein the second thermoplastic resin has a melt flow rate, as determined according to ASTM D-1238 at 230° C., 2.16 kg, of from about 0.1 g/10 min to about 10.0 g/10 min.

Embodiment V

The method of any one of Embodiments S to U, wherein the masterbatch comprises from about 25 wt % to about 75 wt % of the metal oxide based on the weight of the masterbatch.

Embodiment W

The method of any one of Embodiments S to V, wherein the metal oxide in the masterbatch is added in an amount of from about 0.5 to about 4.0 parts by weight elastomer.

Embodiment X

A method of making a thermoplastic vulcanizate, the method comprising the steps of:
adding a poly(ethylene-propylene-diene)copolymer to a twin-screw extruder through the feed throat of the extruder;
adding a polypropylene to the twin-screw extruder through the feed throat of the extruder;
mixing, within an initial mix zone, the poly(ethylene-propylene-diene)copolymer and the polypropylene at a temperature above the melt temperature of the polypropylene to form a molten mass;
adding a masterbatch comprising a polypropylene and a zinc oxide to the twin-screw extruder through an inlet in a barrel downstream of the initial mix zone;
melting the polypropylene in the masterbatch and mixing the molten polypropylene with the molten mass;
adding a phenolic resin curative to the twin-extruder through an inlet in a barrel downstream of the barrel where the masterbatch is added;
mixing the phenolic resin curative with the molten mass while transferring the molten mass through a cure zone where dynamic vulcanization of the poly(ethylene-propylene-diene)copolymer takes place to form a thermoplastic vulcanizate; and
removing the thermoplastic vulcanizate from the twin-screw extruder.

Embodiment Y

Thermoplastic vulcanizates made by the method of any one of Embodiments A to X.

Headings used herein are for reference only and are not intended to limit any aspect of the invention.

Certain embodiments and features have been described using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method of making a thermoplastic vulcanizate, the method comprising the steps of:
    adding vulcanizable elastomer comprising a poly(ethylene-propylene-diene)copolymer to a reactor;
    adding a masterbatch comprising a thermoplastic resin and a metal oxide comprising zinc oxide to the reactor, wherein the thermoplastic resin comprises a polypropylene;
    adding a phenolic resin curative to the reactor; and
    dynamically vulcanizing the elastomer with the curative in the presence of the metal oxide.

2. The method of claim 1, further comprising the step of mixing the vulcanizable elastomer and the masterbatch above the melt temperature of the thermoplastic resin.

3. The method of claim 1, further comprising the step of adding to the reactor a thermoplastic resin substantially devoid of the metal oxide.

4. The method of claim 3, wherein the thermoplastic resin in the masterbatch is the same as the thermoplastic resin substantially devoid of the metal oxide.

5. A method of making a thermoplastic vulcanizate, the method comprising the steps of:
    a. mixing a vulcanizable elastomer comprising a poly(ethylene-propylene-diene)copolymer and at least one first thermoplastic resin comprising a first polypropylene above the melt temperature of the first thermoplastic resin to form a molten mass;
    b. adding a masterbatch consisting essentially of a second thermoplastic resin comprising a second polypropylene and a metal oxide comprising zinc oxide to the molten mass;
    c. melting the second thermoplastic resin to disperse the metal oxide within the molten mass;
    d. adding a phenolic resin curative to the molten mass; and
    e. dynamically vulcanizing the elastomer with the curative in the presence of the metal oxide.

6. The method of claim 5, wherein the first thermoplastic resin is substantially devoid of metal oxide.

7. The method of claim 5, wherein the metal oxide is at least one oxide of a zinc, calcium, magnesium, aluminum, and ferrite.

8. The method of claim 5, wherein the zinc oxide has a mean particle diameter of from about 0.01 μm to about 0.5 μm.

9. The method of claim 5, wherein the masterbatch comprises from about 25 wt % to about 75 wt % of the metal oxide based on the weight of the masterbatch.

10. The method of claim 5, wherein the masterbatch comprises about 40 wt % to about 60 wt % of the metal oxide based on the weight of the masterbatch.

11. The method of claim 5, wherein the masterbatch contains less than 25 wt % of material other than the metal oxide or the thermoplastic resin based on the weight of the masterbatch.

12. The method of claim 5, wherein the masterbatch contains less than 5 wt % of material other than the metal oxide or the thermoplastic resin based on the weight of the masterbatch.

13. The method of claim 5, wherein the masterbatch contains consists essentially of the metal oxide and the thermoplastic resin.

14. The method of claim 5, wherein the masterbatch is added to the reactor in form of pellets.

15. The method of claim 5, wherein the thermoplastic resin in the masterbatch has a melt flow rate, as determined according to ASTM D-1238 at 230° C., 2.16 kg, of from about 0.1 g/10 min to about 50.0 g/10 min.

16. The method of claim 5, wherein the metal oxide in the masterbatch is added in an amount from about 0.25 to about 5.0 parts by weight per 100 parts by weight elastomer.

17. The method of claim 5, wherein the metal oxide in the masterbatch is added in an amount from about 0.5 to about 4.0 parts by weight per 100 parts by weight elastomer.

18. A method of making a thermoplastic vulcanizate, the method comprising the steps of:
    adding a poly(ethylene-propylene-diene)copolymer to a twin-screw extruder through the feed throat of the extruder;
    adding a polypropylene to the twin-screw extruder through the feed throat of the extruder;
    mixing, within an initial mix zone, the poly(ethylene-propylene-diene)copolymer and the polypropylene at a temperature above the melt temperature of the polypropylene to form a molten mass;
    adding a masterbatch consisting essentially of a polypropylene and a zinc oxide to the twin-screw extruder through an inlet in a barrel downstream of the initial mix zone;
    melting the polypropylene in the masterbatch and mixing the molten polypropylene with the molten mass;
    adding a phenolic resin curative to the twin-extruder through an inlet in a barrel downstream of the barrel where the masterbatch is added;
    mixing the phenolic resin curative with the molten mass while transferring the molten mass through a cure zone where dynamic vulcanization of the poly(ethylene-propylene-diene)copolymer takes place to form a thermoplastic vulcanizate; and
    removing the thermoplastic vulcanizate from the twin-screw extruder.

19. A thermoplastic vulcanizate made by the method of claim 5.

20. The method of claim 1, wherein the zinc oxide has a mean particle diameter of from about 0.01 μm to about 0.5 μm.

21. The method of claim 18, wherein the zinc oxide has a mean particle diameter of from about 0.01 μm to about 0.5 μm.

* * * * *